United States Patent

[11] 3,622,191

[72] Inventor Elliott Lee Nolley
419 North Walnut St., Tallulah, La. 71282
[21] Appl. No. 861,291
[22] Filed Sept. 26, 1969
[45] Patented Nov. 23, 1971

[54] LITTER STICK DEVICE
5 Claims, 7 Drawing Figs.
[52] U.S. Cl. .................................................. 294/61, 294/50.9
[51] Int. Cl. .................................................. F41b 13/10
[50] Field of Search ........................................ 294/19, 24, 50.8, 50.9, 61, 66, 125, 26

[56] References Cited
UNITED STATES PATENTS
2,087,671 7/1937 Knights .................. 294/50.9
2,228,690 1/1941 Crary ..................... 294/61
3,221,485 12/1965 Jenkins.................... 294/61

Primary Examiner—Evon C. Blunk
Assistant Examiner—Johnny D. Cherry
Attorney—Berman, Davidson and Berman ABSTRACT: A litter stick for picking up trash and paper and the like comprising an elongated body member with handle means on the top thereof and a detachable adjustable metal pointed shaft means on the bottom thereof with slide means operatively connected to fork means secured to the body member for sliding parallel to the body member and the adjustable metal pointed shaft to remove trash and the like that has been impaled upon said metal pointed shaft.

PATENTED NOV 23 1971     3,622,191
FIG. 1.  FIG. 2.  FIG. 4.  FIG. 5.  FIG. 6.
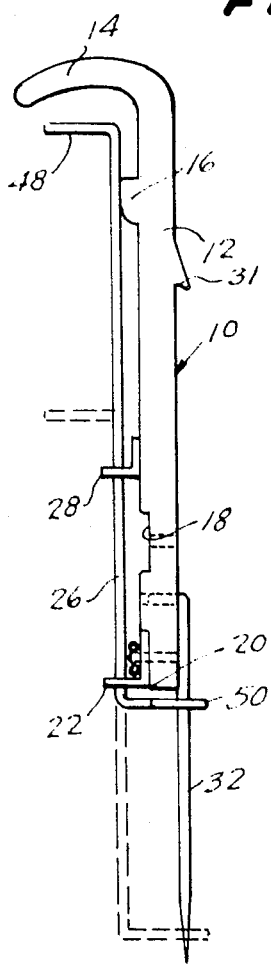
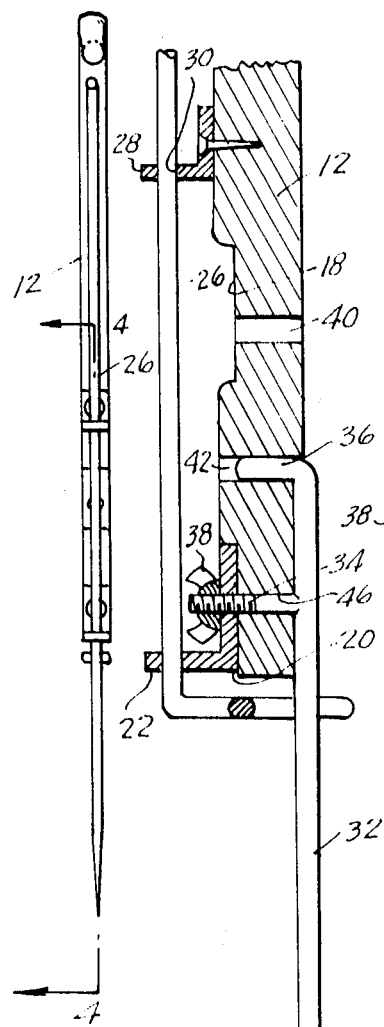
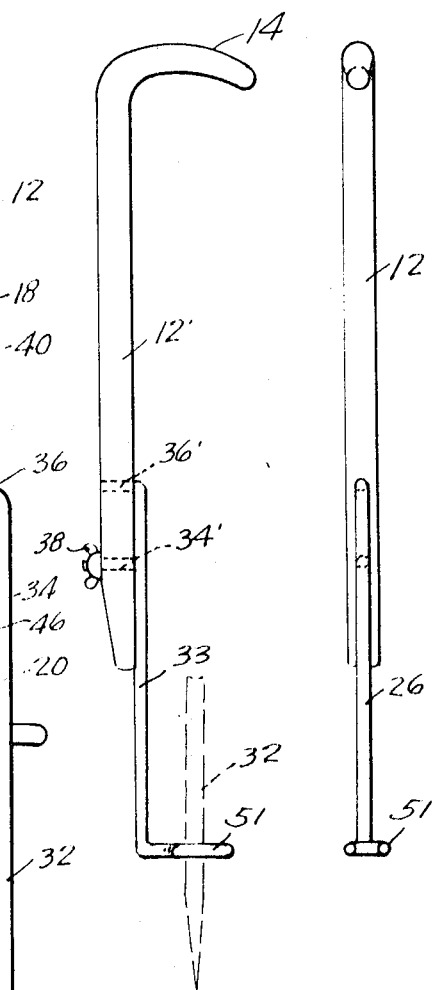
FIG. 3.
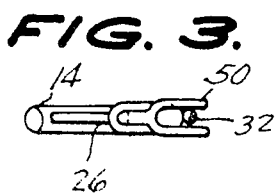
FIG. 7.
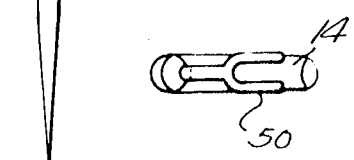
INVENTOR.
ELLIOTT LEE NOLLEY,
BY
Berman, Davidson & Berman,
ATTORNEYS.

LITTER STICK DEVICE

The present invention relates to a hand-operated litter stick for removing litter and trash and rubbish from many and various surfaces.

It is an object of the present invention to provide a novel trash and rubbish litter lifter device that is provided with means to impale or impinge thereon a piece of trash and thereafter lift the impaled trash and then to provide slidable rod means that will push the trash off of the end of the impaling member so as to dispose of it in a proper container.

It is another object of the present invention to provide a litter stick device that has an adjustable metal pointed shaft which can be inverted when not in use so that the sharp point thereon will not cause injury or damage to anything.

Various other objects and advantages of the present invention will be readily apparent from the following detailed description when considered in connection with the accompanying drawing forming a part thereof and in which FIG. 1 is a side elevational view of the litter stick device embodied in the present invention, FIG. 2 is a rear view of the device shown in Fig. 1, FIG. 3 is a bottom plan view of the device shown in Fig. 1, FIG. 4 is an enlarged detail section taken along the lines 4—4 of Fig. 2, FIG. 5 is a modified embodiment of the invention shown in Fig. 1, when seen in side elevation, FIG. 6 is a rear view of the modified embodiment of the invention shown in Fig. 5, and FIG. 7 is a bottom plan view of Fig. 6.

Referring to the drawing, the reference numeral 10 generally designates the litter stick device of the present invention, which is provided with an elongated body member 12 with a curved handle 14 adjacent its upper end and a guide member 16 on its rear side facing in the same direction as the handle 14. The lower end of the rear side of the body member is provided with two vertically spaced slots or recesses 18 and 10 therein adapted to receive an adjustable L-shaped member 22 that is provided with an aperture or opening 24 therein through which extends a slidable rod 26. The rear face of the body member is also provided with an upper L-shaped member 28 secured thereto by a screw and also provided with an aperture or opening 30 for the slidable rod or bar 26 to extend therethrough.

The lower end of the body member 12 has secured thereto an elongated metal pointed shaft 32 for picking up trash and papers and beer cans or other containers from the ground. The metal pointed shaft has a threaded member 34 secured thereto and an upper horizontal bar section 36, as best seen in Figure 4. The shaft 32 is secured to the lower end of the body member by a butterfly nut 38 disposed on the threaded member 34. The body member is provided with a plurality of horizontally extending slots 40, 42 and 46 therein for receiving the bar section 36 and the threaded member 34 therethrough. If it is desired to adjust the vertical overall height of the device 10, the bar section 36 and the threaded member 34 may be disposed in the two upper slots 40 and 42, or they may be disposed in the lower slots 42 and 46 if it is desired to elongate the device, as best seen in Fig. 4. The L-shaped member 22 is secured in the recess 20 by threading it below or underneath the butterfly nut 38. If desired, the L-shaped member 22 may be disposed in the upper slot 18 and the metal pointed shaft 32 is disposed in a safety position at this time, with the metal shaft 32 being inverted and the threaded member 34 being disposed in the slot 40 so that the metal shaft does not have its pointed end sticking out beyond the body member 12. A protuberance 31 on member 12 covers the shaft tip.

The slidable rod 26 is provided with a handle 48 adjacent its upper end and a horizontally extending fork 50 adjacent its lower end through which the pointed metal shaft 32 extends.

When using the litter device of the present invention, the operator grasps the handle 14 and when he wishes to pick up an object from the ground he will stick the lower end of the pointed shaft 32 through the trash or the piece of paper or the debris that he desires to pick up. Thereafter he will remove it from the litter stick by grasping the handle 48 of the slidable rod 26 and pushing the rod downwardly to the dotted position illustrated in Fig. 1 so that the piece of material that has been impaled on the rod 32 can be shoved or removed from the end of the shaft 32 and emptied into a container or a bag or a desired location.

In the embodiment shown in Figs. 5 to 7, the body member 12' has no slots 18 and 20. A rod, 33, with a bar section 34' and nut 38' is detachably secured to member 12 and has a fork 51 on its lower end. In this embodiment the impaling shaft or pin is adapted to be extended through fork 51, as best indicated in dotted lines in Fig. 5. To pick up debris, the impaling pin is placed on top of a piece of debris to be picked up and thereafter the handle 14 is raised with the fork 51 thus pulling the debris upwardly on the shaft to raise it from the ground.

Thus from the foregoing description it is apparent that the present invention provides a novel and sturdy and easily manufactured litter device that has means for impaling trash thereon and pusher means which are slidable for removing the trash therefrom and which device can have its overall length adjusted so that a person does not have to bend or stoop in order to pick up the trash, and which further has means for permitting the impaling rod to be inverted so as to provide a safety device so that when the device is not in use it can be readily stored without injury or damage to any article or person.

What is claimed is:

1. A litter stick device comprising an elongated body member having a plurality of spaced horizontally extending slots therein adjacent its lower end, a litter-impaling shaft having a point at one end and a plurality of spaced horizontally extending bar members adjacent its opposite end, said bar members being detachably disposed within said slots so as to selectively secure said impaling shaft to said body member either in an operative position with the pointed end of said impaling shaft extending downwardly away from said body member or in a storage position with said pointed end extending upwardly along said body member, a vertically slidable rod connected to said body member and having a horizontally extending fork on its lower end, said impaling shaft extending through said fork when in its operative position, and guard means on said body member for covering said pointed end when said impaling shaft is in its storage position.

2. The device of claim 1 wherein said guard means comprises a protuberance extending outwardly from said body member.

3. The device of claim 1 wherein one of said bar members is threaded and has a nut securing said impaling shaft to said body member.

4. The device of claim 1 wherein guide means are provided for said slidable rod including L-shaped members secured to said body member, and said slidable rod extends through openings in said L-shaped members.

5. The device of claim 4 wherein said body member has vertically spaced recesses on one side thereof for receiving one of said L-shaped members therein and handle means are disposed at the top of said body member and said slidable rod.

* * * * *